United States Patent [19]

Ando

[11] 4,420,126
[45] Dec. 13, 1983

[54] WEBBING LOCK DEVICE
[75] Inventor: Takayuki Ando, Okazaki, Japan
[73] Assignees: Toyota Jidosha Kogyo Kabushiki Kaisha; Kabushiki Kaisha Tokai-Rika-Denki-Seisakusho, both of Aichi, Japan
[21] Appl. No.: 351,369
[22] Filed: Feb. 23, 1982
[30] Foreign Application Priority Data Mar. 3, 1981 [JP] Japan ................................ 56-29245[U]

[51] Int. Cl.³ ...................... A62B 35/02; B65H 75/48; B65H 59/16
[52] U.S. Cl. ................................ 242/107.2; 188/65.1; 280/806
[58] Field of Search .............................. 188/65.1, 65.4; 242/107.2; 280/806, 808; 297/478, 479, 480; 24/DIG. 22

[56] References Cited
U.S. PATENT DOCUMENTS 4,286,759  9/1981  Usami et al. ...................... 242/107.2

Primary Examiner—Stuart S. Levy
Assistant Examiner—Lloyd D. Doigan
Attorney, Agent, or Firm—Parkhurst & Oliff

[57] ABSTRACT

A webbing lock device provided in a webbing retractor capable of winding and unwinding a webbing, comprising: a stationary clamp member opposed to one surface of the webbing and disposed close thereto; a movable clamp member opposed to the other surface of the webbing; and a contact portion having wound thereon the webbing, connected to the movable clamp member through a deformable member and movable to cause said movable clamp member to move towards said stationary clamp member due to a tension generated in the webbing, the deformable member being deformed or broken when the tension in the webbing exceeds a predetermined value, to thereby allow the contact portion to move relative to the movable clamp member; whereby abutting forces applied to the webbing by the stationary and movable clamp members are restricted.

8 Claims, 6 Drawing Figures

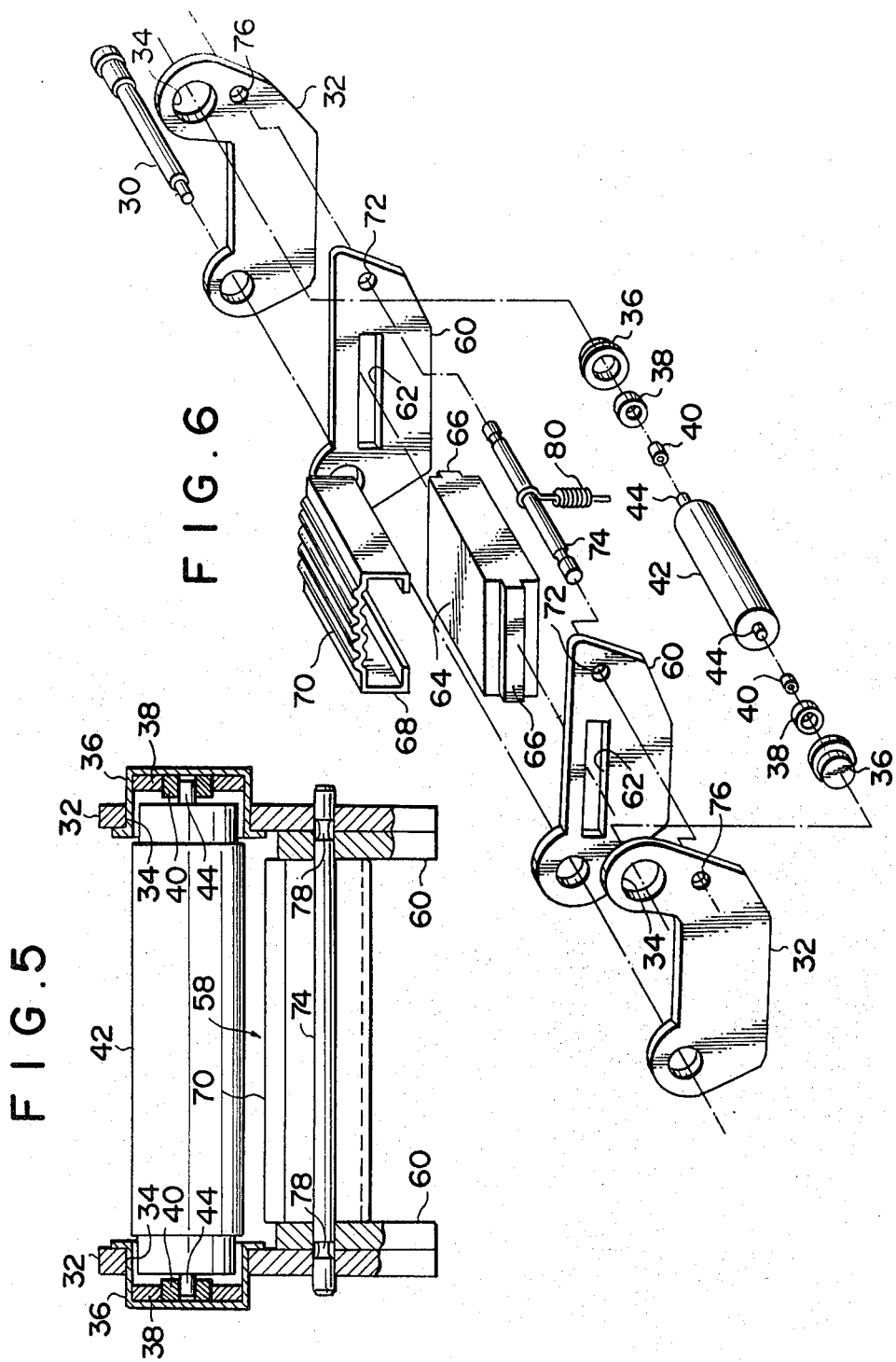

WEBBING LOCK DEVICE

BACKGROUND OF THE INVENTION

This invention relates to a webbing lock device for locking as necessary an occupant restraining webbing used in a seatbelt system for protecting an occupant in the event of an emergency situation of a vehicle, and particularly to a webbing lock device wherein the intermediate portion of the webbing is directly clamped to lock the webbing, whereby the occupant is brought into a restrained state.

In an ordinary webbing retractor used in a seatbelt system, even after the webbing unwinding rotation of a takeup shaft is locked, the condition of loosely wound webbing takes place, thus causing to unwind a considerable length of the webbing. To overcome this disadvantage, there has been proposed a webbing lock device wherein, when the tension of the webbing is increased, the increased webbing tension is utilized to directly clamp and lock the intermediate portion of the webbing.

In this webbing lock device, a pair of clamp members are caused to approach each other by the webbing tension in the event of an emergency situation of the vehicle, whereby the webbing is clamped between the clamp members to be prevented from moving in the longitudinal direction thereof, thereby enabling to restrain the occupant.

However, with the conventional webbing lock device of the type described, the force of clamping the webbing by the pair of clamp members increases in proportion to the webbing tension, and consequently, when the webbing tension has increased to an extreme extent, the clamping force increased in proportion to the webbing tension presses the intermediate portion of the webbing beyond necessity, thereby possibly causing damages to the webbing.

The present invention has been developed to obviate the abovedescribed disadvantages of the prior art and has as its object the provision of a webbing lock device wherein, even when the webbing tension increases to an extreme extent, the clamp members do not cause damages to the intermediate portion of the webbing.

In the webbing lock device according to the present invention, a deformable member is provided between a contact portion on which the webbing is wound and the clamp members, and, when the webbing tension exceeds a predetermined value, the force of clamping the webbing is restricted by the deformation of the deformable member.

BRIEF DESCRIPTION OF THE DRAWINGS

FIG. 5 is a sectional view taken along the line V—V in FIG. 3; and

FIG. 6 is a disassembled perspective view of FIG. 4.

Description will hereunder be given of an embodiment of the present invention.

Figure 1:
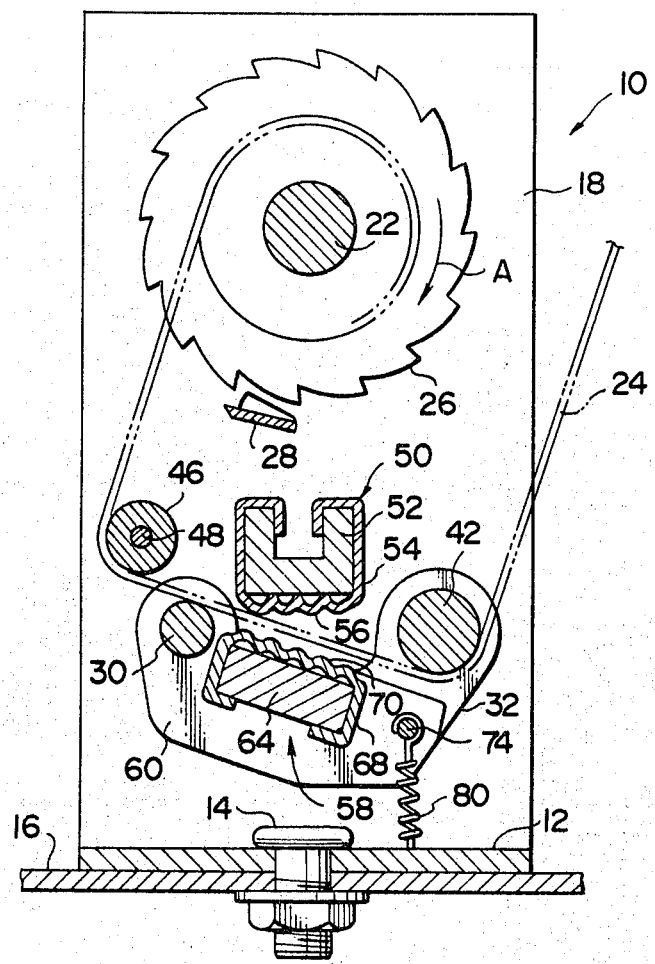
FIG. 1 is a sectional view showing an embodiment of the webbing lock device according to the present invention.

FIG. 1 shows a webbing retractor 10 incorporating a webbing lock device according to the present invention. In this webbing retractor 10, a frame 12 is solidly secured to a vehicle body 16 through a mounting bolt 14.

A pair of leg plates 18 in parallel to each other are erected from the opposite sides of this frame 12, and a takeup shaft 22 is journalled on the leg plates 18 (However, FIG. 1 shows only one of the leg plates 18). One end portion of a webbing 24 is wound in layers by this takeup shaft 22, which is biased in a direction of winding the webbing 24 (a direction indicated by an arrow A in FIG. 1) by a biasing force of a spiral spring, not shown. The other end portion, not shown, of the webbing 24 is withdrawn out of the retractor 10 and reaches an occupant restraining portion.

A pair of ratchet wheels 26 are solidly secured to the takeup shaft 22 and opposed to a pawl 28 tiltably supported by the parallel leg plates 18. This pawl 28 is adapted to be actuated by an acceleration sensor, not shown, constituted by a pendulum or the like, and meshed with the ratchet wheels 26 to thereby prevent the webbing unwinding rotations (a direction opposite the direction indicated by the arrow A) of the ratchet wheels 26 and the takeup shaft 22.

Figure 4:
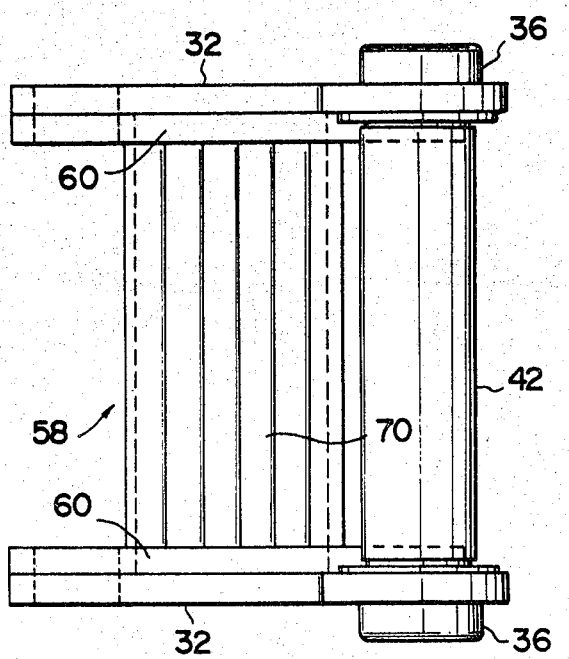
FIG. 4 is a plan view of FIG. 3.

Journalled on the lower portions of the parallel leg plates 18 is a support shaft 30, on which respective ends of a pair of outer arms 32 are journalled. Penetratingly provided at the other ends of these outer arms 32 are round holes 34, into which bottomed cylindrical holders 36 are press-fitted as detailedly shown in FIGS. 4 and 5. Disk-shaped bush holders 38 are press-fitted into the bottoms of these cylindrical holders 36, respectively. Disk-shaped bushes 40 are press-fitted into through-holes provided at axial portions of these bush holder 38. Penetratingly provided in the axial portions of these disk-shaped bushes 40 are round holes, by which are rotatably supported small diameter portions 44 integrally formed at opposite end portions of a roller 42 which is a webbing contact member. Consequently, this roller 42 is subjected to a frictional force caused by a friction between the outer peripheries of the small diameter portions 44 and the inner peripheries of the bushes 40 when the webbing 24 is wound or unwound. However, the small diameter portions 44 have satisfactorily small diameters, so that the webbing 24 can be wound or unwound with a low rotating resistance.

A slight gap is formed between the outer peripheries of the axially opposite end portions of the roller 42 and the inner diameters of the bottomed cylindrical holders 36 press-fitted into the outer arms 32 (Refer to FIG. 5). Owing to these gaps, during normal running condition of a vehicle, the outer periphery of the roller 42 is prevented from contacting the cylindrical holders 36. However, when increased tension in the webbing 24 deforms the small diameter portions 44 or the bushes 40, the outer peripheral portions of the roller 42 comes into contact with the inner peripheries of the holders 36, whereby the roller 42 is subjected to a rotational resistance.

As shown in FIG. 1, the webbing 24, which has been unwound from the takeup shaft 22 and wound on the roller 42, is wound at its intermediate portion onto the roller 46. This roller 46 is rotatably supported on the leg plates 18 of the frame 12 through a shaft 48.

A stationary clamp member 50 is provided at one side of a portion of the webbing 24 between the rollers 46 and 42. This stationary clamp member 50 comprises a base plate 52 and a lock plate 54 secured to the outer periphery of the base plate 52. The base plate 52 is solidly secured at longitudinally opposite end portions to the leg plates 18. Additionally, the lock plate 54 has a surface opposed to the webbing 24, which is formed with a corrugated portion 56. On the other hand, provided at the other side of the portion of the webbing 24 and opposed to the stationary clamp member 50 is a movable clamp member 58. As shown in FIGS. 3 through 6, this movable clamp member 58 is secured to a pair of inner arms 60.

As shown in FIG. 6, respective ends of these inner arms 60 are rotatably supported on the support shaft 30 along with the outer arms 32. These inner arms 60 are respectively provided at the intermediate portions thereof with rectangular holes 62, into which are inserted projections 66 formed at longitudinally opposite end portions of the base plate 64 constituting the movable clamp member 58. A thin plate-shaped lock plate 68 is secured to the outer periphery of this base plate 64 and has a surface opposed to the webbing 24, which is formed with a corrugated portion 70. When the corrugated portion 70 approaches the corrugated portion 56, the intermediate portion of the webbing 24 is adapted to be clamped therebetween.

The inner arms 60 are respectively provided at the other ends thereof with small holes 72, through which is inserted a pin 74. Opposite end portions of the pin 74 are further inserted through small holes 76 penetrated in the outer arms 32, so that the inner arms 60 can be integrally rotated with the outer arms 32 about the support shaft 30. However, when a relative load exceeding a predetermined value occurs between the outer arms 32 and the inner arms 60, the pin 74 is broken down or deformed, so that the outer arms 32 and the inner arms 60 can be rotated about the support shaft 30 relative to each other. For this purpose, small diameter portions 78 are formed at opposite end portions of the pin 74 as shown in FIG. 5, so that the pin 74 can be reliably deformed or broken down when subjected to a load exceeding the predetermined value.

Additionally, respectively secured to the intermediate portion of the pin 74 is end of tension coil spring 80, the other end of which is secured to the frame 12, whereby the inner arms 60 are biased in the clockwise direction in FIG. 1, i.e., in a direction in which the movable clamp member 58 is separated from the webbing 24.

Description will now be given of action of this embodiment. The end portion of the webbing 24, which has been unwound from the takeup shaft 22, is guided by the rollers 46 and 42, withdrawn to the occupant restraining portion and fastened about an occupant.

Here, during normal running condition of the vehicle, the occupant pulls out the webbing 24 of a required length, so that he can change his driving posture. In this case, the roller 42 is supported by the bushes 40 through the small diameter portions having the satisfactorily small diameters, whereby the roller 42 is rotatable with a low frictional resistance, so that the movement of the webbing can be effected very smooth when the webbing is fastened about the occupant, the occupant changes his driving posture during driving, and the webbing is wound after the unfastening of the webbing from the occupant.

When the vehicle has fallen into the event of an emergency situation such as a collision, the acceleration sensor, not shown is actuated to cause the pawl 28 to be meshed with the ratchet wheels 26, whereby the webbing unwinding rotation of the takeup shaft 22 is abruptly stopped.

On the other hand, the webbing 24 undergoes the inertial force of collision of the occupant to be increased in tension, whereby the tension is imparted to the roller 42, so that the inner arms 60 are rotated about the support shaft 30 along with the outer arms 32 against the biasing forces of the tension coil springs 80. Due to this rotation, the movable clamp member 58 approaches the stationary clamp member 50, whereby the corrugated portion 70 clamps the intermediate portion of the webbing 24 in cooperation with the corrugated portion 56. Due to this clamping, a high tension is not imparted to the portion of the webbing 24 between this clamped portion and the takeup shaft 22, so that the webbing 24 can avoid being unwound from the takeup shaft 22 to a large extent, thereby enabling to secure the occupant in a tightly restrained state by the webbing.

In this clamped state, the tension of the webbing 24 is imparted to the small diameter portions 44 through the roller 42, and, if the tension of the webbing 24 exceeds a certain degree, then the small diameter portions 44 is deformed to allow the outer peripheral portions of the roller 42 to contact the inner peripheries of the cylindrical holders 36, whereby the roller 42 is subjected to the rotational resistance. This rotational resistance keeps down the tension generated in the portion of the webbing 24 between the roller 42 and the takeup shaft 22. In this respect too, the clamp members 50 and 58 can reliably clamp and restrain the intermediate portion of the webbing 24.

Further, depending upon the conditions of the collision of the vehicle, particularly in the case of a collision at an extraordinarily high speed, the tension generated in the webbing 24 may increase to a considerably high degree. In this case, the clamp member 58 is biased towards the stationary clamp member 50 further stronger. However, the tension of the webbing 24 imparted to the outer arms 32 through the roller 42 is transmitted to the inner arms 60 via the pin 74, this extremely high webbing tension deforms or breaks down the pins 74.

Figure 2:
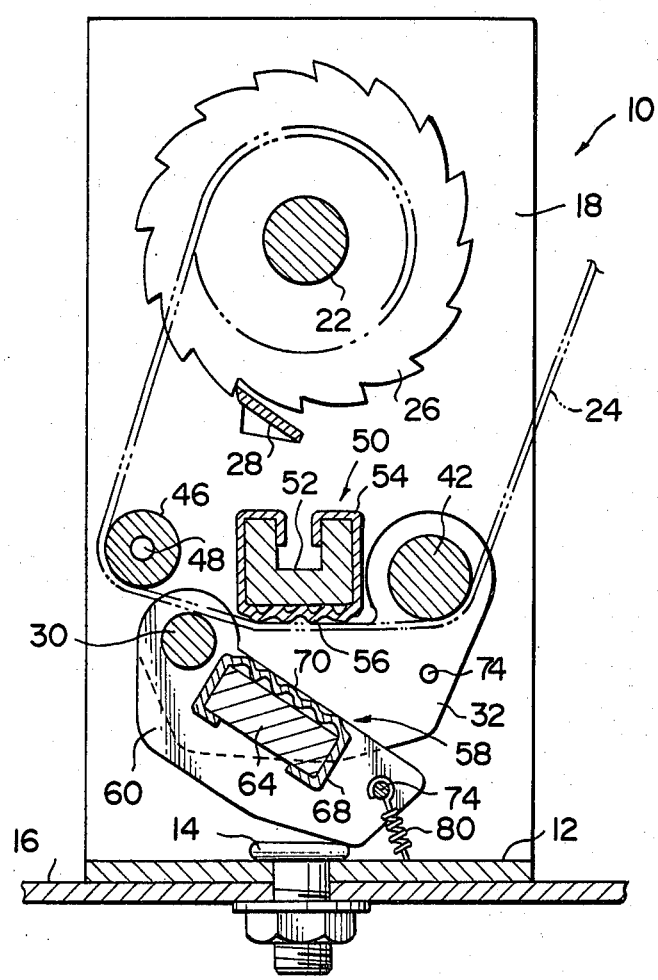
FIG. 2 is a view illustrating the embodiment in an active position.
Figure 3:
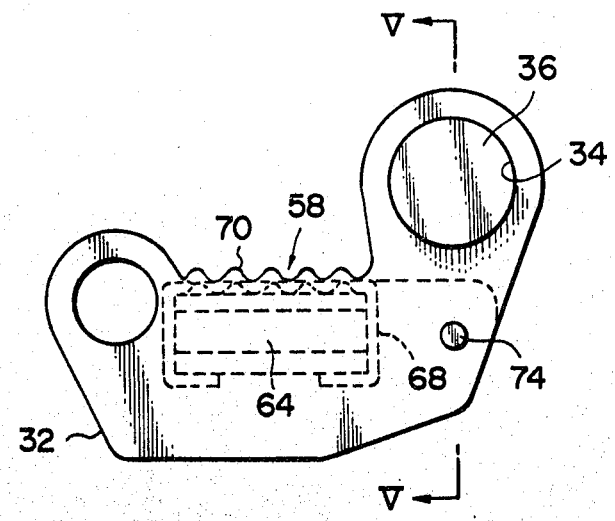
FIG. 3 is a front view showing the connected state of the outer arm and the inner arm.

As a result, as shown in FIG. 2, the inner arms 60 become movable relative to the outer arms 32, is rotated by the biasing force of the tension coil spring 80 in the clockwise direction, whereby the movable clamp member 56 is separated from the stationary clamp member 50. By this, when the tension of the webbing 24 unusually increases, the clamping force by the clamp members 50 and 58 is releasable, thus enabling to prevent damages to the intermediate portion of the webbing 24. In addition, if the outer arms 32 become rotatable relative to the inner arms 60, then, as shown in FIG. 2, the outer arms 32 rotate in the counterclockwise direction, and thereafter, abut against the stationary clamp member 50 and stop thereat.

Even when the clamp members 50 and 58 release the webbing 24, the pawl 28 meshes with the ratchet wheels 26 to prevent the takeup shaft 22 from its unwinding rotation so that the occupant is not released from the webbing 24. Therefore the safety of the occupant is insured.

In the foregoing, there has been shown the embodiment in which the outer arms and the inner arms are connected to each other though the pin as being deformable members which are deformable or breakable. This arrangement can be replaced by another arrangement in which a spring, which is resiliently deformable when an unusual tension occurs, is provided between the roller, on which the webbing is wound, and the movable clamp member to thereby prevent a clamping force exceeding the predetermined value from being generated.

As has been described hereinabove, in the webbing lock device according to the present invention, deformable member, which is deformable when the webbing tension exceeds a predetermined value, is provided. Hence, the present invention can offer the outstanding advantage that the intermediate portion of the webbing is reliably prevented from damaging to thereby enable to keep restraining the occupant.

What is claimed is:

1. A webbing lock device provided in a webbing retractor capable of winding and unwinding a webbing, comprising:
    a stationary clamp member opposed and adjacent to one surface of the webbing;
    a movable clamp member opposed to the outer surface of the webbing and having freedom of movement towards and away from said stationary clamp member;
    a biasing means for biasing said movable clamp member away from said stationary clamp member;
    a roller on which the webbing is wound;
    a roller support member which rotatably supports said roller;
    a deformable member rotatably supported by said roller support member and connected with said roller, whereby said roller is supported by said roller support member through said deformable member, said deformable member designed to deform to displace said roller so as to abut said roller against a portion of said roller support member when tension of the webbing reaches a predetermined value; and
    a connecting member connecting said roller support member with said movable clamp member, said connecting member being designed to break and release said roller support member from said movable support member when the tension of said webbing reaches a value higher than said predetermined value.

2. A webbing lock device as set forth in claim 1, wherein said connecting member is a pin.

3. A webbing lock device as set forth in claim 1, wherein said stationary and movable clamp members have corrugated portions, respectively, with which said clamp members abut against the webbing.

4. A webbing lock device in accordance with claim 1, wherein said roller support member comprises a pair of outer arms for supporting opposite ends of said roller.

5. A webbing lock device in accordance with claim 1, wherein said biasing means is a spring.

6. A webbing lock device in accordance with claim 1, wherein said movable clamp member is rotatable about an axis concentric with the axis of rotation of said roller.

7. A webbing lock device provided in a webbing retractor capable of winding and unwinding a webbing, comprising:
    a stationary clamp member opposed and adjacent to one surface of the webbing;
    a movable clamp member opposed to the outer surface of the webbing and having freedom of movement towards and away from said stationary clamp member;
    a biasing means for biasing said movable clamp member away from said stationary clamp member;
    a roller on which the webbing is wound;
    a roller support member which rotatably supports said roller;
    a deformable member rotatably supported by said roller support member and connected with said roller, whereby said roller is supported by said roller support member through said deformable member, said deformable member designed to deform to displace said roller so as to abut said roller against a portion of said roller support member when a tension of the webbing reaches a predetermined value; and
    a connecting member connecting said roller support member with said movable clamp member, said connecting member being designed to deform and release said roller support member from said movable support member when the tension of said webbing reaches a value higher than said predetermined value.

8. A webbing lock device as set forth in claim 7, wherein said connecting member is a spring.

* * * * *